United States Patent
Choi et al.

(10) Patent No.: US 10,227,488 B2
(45) Date of Patent: Mar. 12, 2019

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Ki Hong Choi, Uiwang-si (KR); Seung Shik Shin, Uiwang-si (KR); Hyun Ho Lee, Uiwang-si (KR); Kyuong Sik Chin, Uiwang-si (KR); Sung Hun Choi, Uiwang-si (KR); Dong In Ha, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/392,106

(22) Filed: Dec. 28, 2016

(65) Prior Publication Data
US 2017/0190908 A1    Jul. 6, 2017

(30) Foreign Application Priority Data
Dec. 31, 2015    (KR) .................. 10-2015-0191436

(51) Int. Cl.
*C08L 69/00*    (2006.01)

(52) U.S. Cl.
CPC ........... *C08L 69/00* (2013.01); *C08L 2207/04* (2013.01)

(58) Field of Classification Search
CPC ............ C08L 69/00; C08K 3/34; C08K 5/521
See application file for complete search history.

(56) References Cited

U.S. PATENT DOCUMENTS

| | | |
|---|---|---|
| 2003/0004251 A1 | 1/2003 | Hashimoto et al. |
| 2004/0178383 A1* | 9/2004 | Kikuchi .................. C08L 25/12  252/62 |
| 2012/0100377 A1 | 4/2012 | Seidel et al. |
| 2014/0323625 A1 | 10/2014 | Kim et al. |

FOREIGN PATENT DOCUMENTS

| | | | |
|---|---|---|---|
| EP | 1300445 A1 | 4/2003 | |
| EP | 2796507 A1 | 10/2014 | |
| JP | 06-049343 | * 8/1992 | ............... C08K 3/34 |
| JP | 2004-035812 | * 2/2004 | ............... C08L 51/04 |
| JP | 2004-323565 A | 11/2004 | |
| JP | 2007-269821 A | 10/2007 | |
| KR | 10-2011-0059886 A | 6/2011 | |

OTHER PUBLICATIONS

Machine translation of JP 06-049343. Aug. 1992.*
Machine translation of JP 2004-035812. Feb. 2004.*
Extended European Search Report in the counterpart European Patent Application No. 16207036.1 dated May 10, 2017, pp. 1-6.

* cited by examiner

*Primary Examiner* — John E Uselding
(74) *Attorney, Agent, or Firm* — Additon, Higgins & Pendleton, P.A.

(57) ABSTRACT

Disclosed herein are a thermoplastic resin composition and a molded article produced from the thermoplastic resin composition. The thermoplastic resin composition includes: a polycarbonate resin; a rubber-modified vinyl graft copolymer; inorganic fillers comprising talc and wollastonite; maleic anhydride-modified olefin wax; and a phosphorus compound represented by the following Formula 1, wherein a weight ratio of the talc to the wollastonite ranges from about 1:0.1 to about 1:0.9, and a weight ratio of the talc to the phosphorus compound ranges from about 1:0.005 to about 1:0.05:

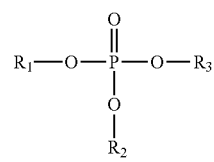

[Formula 1]

wherein $R_1$ and $R_2$ are the same or different and are each independently a hydrogen atom or a $C_1$ to $C_{10}$ alkyl group and $R_3$ is a $C_{10}$ to $C_{30}$ alkyl group. The thermoplastic resin composition can have excellent properties in terms of impact resistance, stiffness, dimensional stability, appearance, and balance therebetween.

9 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application 10-2015-0191436, filed on Dec. 31, 2015, in the Korean Intellectual Property Office, the entire disclosure of which is incorporated herein by reference.

FIELD

The present invention relates to a thermoplastic resin composition and a molded article produced from the same.

BACKGROUND

Polycarbonate resins are engineering plastics with excellent impact resistance, heat resistance, dimensional stability, weatherability, chemical resistance, electrical properties, transparency, and the like, and thus have been applied to various fields such as office automation, electrical/electronic products, and automotive parts.

In addition, a polycarbonate resin may be used in the form of a thermoplastic resin composition including additives such as reinforcing fillers, impact modifiers, and antioxidants to further improve stiffness and impact resistance and to reduce production costs, depending on application.

However, when reinforcing fillers such as glass fiber are blended with a polycarbonate resin, fluidity (moldability) and impact resistance of the resin composition can deteriorate, and the reinforcing fillers can protrude from a surface of a molded article, causing deterioration in appearance characteristics. In addition, when flake-type talc is used as a reinforcing filler, there is a limit to improvement in dimensional stability, and mechanical properties of the resin composition, such as impact resistance, can deteriorate due to brittleness of the talc, although appearance characteristics of the resin composition can be improved.

Therefore, there is a need for a polycarbonate-based thermoplastic resin composition which can provide excellent properties in terms of impact resistance, stiffness, dimensional stability, appearance, and balance therebetween.

SUMMARY OF THE INVENTION

Exemplary embodiments relate to a thermoplastic resin composition which can have excellent properties in terms of impact resistance, stiffness, dimensional stability, appearance, and balance therebetween, and a molded article produced from the same.

The thermoplastic resin composition includes: a polycarbonate resin; a rubber-modified vinyl graft copolymer; inorganic fillers comprising talc and wollastonite; a maleic anhydride-modified olefin wax; and a phosphorus compound represented by the following Formula 1, wherein a weight ratio of the talc to the wollastonite ranges from about 1:0.1 to about 1:0.9, and a weight ratio of the talc to the phosphorus compound ranges from about 1:0.005 to about 1:0.05,

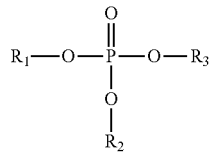

[Formula 1]

wherein $R_1$ and $R_2$ are the same or different and are each independently a hydrogen atom or a $C_1$ to $C_{10}$ alkyl group and $R_3$ is a $C_{10}$ to $C_{30}$ alkyl group.

In exemplary embodiments, the thermoplastic resin composition may include about 100 parts by weight of the polycarbonate resin, about 5 parts by weight to about 20 parts by weight of the rubber-modified vinyl graft copolymer, about 10 parts by weight to about 40 parts by weight of the inorganic fillers, about 0.1 parts by weight to about 5 parts by weight of the maleic anhydride-modified olefin wax, and about 0.1 parts by weight to about 5 parts by weight of the phosphorus compound.

In exemplary embodiments, the rubber-modified vinyl graft copolymer may be prepared by grafting an aromatic vinyl monomer and a monomer copolymerizable with the aromatic vinyl monomer to a rubbery polymer.

In exemplary embodiments, the maleic anhydride-modified olefin wax may be a polymer of about 80 wt % to about 99 wt % of olefin and about 1 wt % to about 20 wt % of maleic anhydride.

In exemplary embodiments, the maleic anhydride-modified olefin wax may have a weight average molecular weight of about 5,000 g/mol to about 100,000 g/mol.

In exemplary embodiments, the thermoplastic resin composition may further include at least one additive selected from among flame retardants, UV stabilizers, fluorescent whitening agents, release agents, nucleating agents, lubricants, antistatic agents, stabilizers, reinforcing agents, pigments, and/or dyes.

In exemplary embodiments, the thermoplastic resin composition may have a notched Izod impact strength of about 4.5 kgf·cm/cm or more, as measured on a ⅛" thick Izod specimen in accordance with ASTM D256.

In exemplary embodiments, the thermoplastic resin composition may have a welded Izod impact strength of about 3.5 kgf·cm/cm or more, as measured on a ⅛" thick Izod specimen having a weld line at a center thereof in accordance with ASTM D256.

In exemplary embodiments, the thermoplastic resin composition may have a coefficient of linear expansion of about 30 μm/° C. to about 60 μm/° C., as measured on a 6.4 mm bent specimen at a temperature of about 10° C. to about 90° C. in accordance with ASTM D696.

In exemplary embodiments, the thermoplastic resin composition may have a degree of warpage of about 5 mm to about 17 mm, as obtained by measuring a distance (height) from the ground to one corner of an injection molded specimen having a size of 15 cm×40 cm×15 mm, with other three corners of the specimen attached to the ground, after leaving the specimen at 23° C. and 50% relative humidity (RH) for 24 hours.

Other embodiments of the present invention relate to a molded article produced from the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A thermoplastic resin composition according to the present invention includes: (A) a polycarbonate resin; (B) a rubber-modified vinyl graft copolymer; (C) inorganic fillers including talc and wollastonite; (D) maleic anhydride-modified olefin wax; and (E) a phosphorus compound.

(A) Polycarbonate Resin

The polycarbonate resin can be a typical thermoplastic polycarbonate resin. For example, the polycarbonate resin may be an aromatic polycarbonate resin prepared by reacting an aromatic diol compound (diphenols) with a carbonate precursor, such as phosgene, halogen formate, or carbonate diester.

Examples of the aromatic diol compound may include without limitation 4,4'-biphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. For example, the aromatic diol compound may include 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane, for example 2,2-bis-(4-hydroxyphenyl)-propane, which is also referred to as bisphenol A.

In exemplary embodiments, the polycarbonate resin may be a branched polycarbonate resin. For example, the polycarbonate resin may be prepared by adding a tri- or more polyfunctional compound, for example, a tri- or higher valent phenol group-containing compound in an amount of 0.05 mol % to 2 mol % based on the total number of moles of the aromatic diol compound used in polymerization.

In exemplary embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In exemplary embodiments, the polycarbonate resin the polycarbonate resin may have a weight average molecular weight (Mw) of about 10,000 g/mol to about 200,000 g/mol, for example, about 15,000 g/mol to about 40,000 g/mol, as measured by gel permeation chromatography (GPC). Within this range, the thermoplastic resin composition can have excellent properties in terms of impact resistance, scratch resistance, and heat resistance.

(B) Rubber-Modified Vinyl Graft Copolymer

The rubber-modified vinyl graft copolymer can serve to improve impact resistance and fluidity of the thermoplastic resin composition and may be prepared by grafting an aromatic vinyl monomer and a monomer copolymerizable with the aromatic vinyl monomer to a rubbery polymer.

Examples of the rubbery polymer may include without limitation: diene rubbers such as polybutadiene, poly(styrene-butadiene), and poly(acrylonitrile-butadiene); saturated rubbers obtained by adding hydrogen to the diene rubbers, isoprene rubbers, and the like; acrylic rubbers such as poly(butyl acrylate); ethylene-propylene-diene monomer terpolymers (EPDM), and the like, and mixtures thereof. For example, the rubbery polymer may be a diene rubber, for example a butadiene rubber.

The rubbery polymer (rubber particles) may have an average (z-average) particle size of about 0.05 μm to about 6 μm, for example, about 0.15 μm to about 4 μm, and as another example about 0.25 μm to about 3.5 μm. Within this range, the thermoplastic resin composition can have excellent properties in terms of impact resistance and appearance. As used herein, the term average particle diameter refers to the Z-average mean size measured by the Mastersizer S Ver 2.14 (Malvern) in accordance with methods known in the art. Z-average particle diameter and methods for measuring the same are well known in the art and are readily understood by the skilled artisan.

The rubber-modified vinyl graft copolymer can include the rubbery polymer in an amount of about 5 wt % to about 65 wt %, for example, about 10 wt % to about 60 wt %, and as another example about 20 wt % to about 50 wt %, based on the total weight (100 wt %) of the rubber-modified vinyl graft copolymer. In some embodiments, the rubber-modified vinyl graft copolymer can include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 5051, 52, 53, 54, 55, 56, 57, 58, 59, 60, 61, 62, 63, 64, or 65 wt %. Further, according to some embodiments, the amount of the rubbery polymer can be in a range from about any of the foregoing amounts to about any other of the foregoing amounts. Within this range, the thermoplastic resin composition can have excellent properties in terms of impact resistance, stiffness, and the like.

The aromatic vinyl monomer is graft-copolymerizable with the rubbery copolymer. Examples of the aromatic vinyl monomer can include without limitation styrene, α-methyl styrene, β-methyl styrene, p-methyl styrene, p-t-butyl styrene, ethyl styrene, vinylxyl ene, monochlorostyrene, dichlorostyrene, dibromostyrene, vinyl naphthalene, and the like, and mixtures thereof. For example, the aromatic vinyl monomer may include styrene.

The rubber-modified vinyl graft copolymer can include the aromatic vinyl monomer in an amount of about 15 wt % to about 94 wt %, for example, about 20 wt % to about 80 wt %, and as another example about 30 wt % to about 60 wt %, based on the total weight (100 wt %) of the rubber-modified vinyl graft copolymer. In some embodiments, the rubber-modified vinyl graft copolymer can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the aromatic vinyl monomer can be in a range from about any of the foregoing amounts to about any other of the foregoing amounts. Within this range, the thermoplastic resin composition can have excellent properties in terms of impact resistance, stiffness, and the like.

Examples of the monomer copolymerizable with the aromatic vinyl monomer may include without limitation: vinyl cyanide compounds, such as acrylonitrile, methacrylonitrile, and/or ethacrylonitrile; and/or monomers for providing processability and heat resistance such as acrylic acid, methacrylic acid, maleic anhydride, and/or N-substituted maleimide. These monomers may be used alone or as a mixture thereof.

The rubber-modified vinyl graft copolymer can include the monomer copolymerizable with the aromatic vinyl monomer in an amount of about 1 wt % to about 50 wt %, for example, about 5 wt % to about 45 wt %, and as another example about 10 wt % to about 30 wt %, based on the total weight (100 wt %) of the rubber-modified vinyl graft copolymer. In some embodiments, the rubber-modified vinyl graft copolymer can include the monomer copolymerizable with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can have excellent properties in terms of impact resistance, heat resistance, processability, and the like.

Examples of the rubber-modified vinyl graft copolymer may include without limitation an acrylonitrile-butadiene-styrene graft copolymer (g-ABS), acrylonitrile-ethylene/propylene rubber-styrene graft copolymer (g-AES), and/or an acrylic rubber-styrene-acrylonitrile graft copolymer (g-ASA).

In exemplary embodiments, the thermoplastic resin composition can include the rubber-modified vinyl graft copolymer in an amount of about 5 parts by weight to about 20 parts by weight, for example, about 8 parts by weight to about 15 parts by weight, based on about 100 parts by weight of the polycarbonate resin. In some embodiments, the thermoplastic resin composition can include the rubber-modified vinyl graft copolymer in an amount of about 5, 6, 7, 8, 9, 10, 11, 12, 13, 14, 15, 16, 17, 18, 19, or 20 parts by weight. Further, according to some embodiments, the amount of the rubber-modified vinyl graft copolymer can be in a range from about any of the foregoing amounts to about any other of the foregoing amounts.

Within this range, the thermoplastic resin composition can have excellent properties in terms of impact resistance, stiffness, appearance, and balance therebetween.

(C) Inorganic Fillers

The inorganic fillers can serve to improve impact resistance, stiffness and dimensional stability of the thermoplastic resin composition and include talc and wollastonite.

In exemplary embodiments, flake-like talc may be used as the talc. The talc may have an average particle size (volume based) of about 2 μm to about 7 μm, for example, about 3 μm to about 5 μm. Within this range, the thermoplastic resin composition can have excellent properties in terms of stiffness and dimensional stability.

In exemplary embodiments, the wollastonite is a calcium-based mineral that is white and has a needle-like shape. The wollastonite may have an average particle size (volume based) of about 1 μm to about 60 μm, for example, about 3 μm to about 40 μm and an average aspect ratio of about 6 or greater, for example, about 7 to about 20.

As used herein, the term average aspect ratio refers to a ratio of the average length (long length) (a) of the wollastonite to the average diameter (b) of the wollastonite (a/b). Within this range, the thermoplastic resin composition can have excellent properties in terms of stiffness, impact resistance, and dimensional stability.

In exemplary embodiments, a weight ratio of the talc to the wollastonite (talc:wollastonite) may range from about 1:0.1 to about 1:0.9, for example, about 1:0.3 to about 1:0.7. In exemplary embodiments, a weight ratio of the talc to the wollastonite (talc:wollastonite) may be about 1:0.1, 1:0.2, 1:0.3, 1:0.4, 1:0.5, 1:0.6, 1:0.7, 1:0.8, or 1:0.9. If the weight ratio of the talc to the wollastonite is less than about 1:0.1, impact resistance of the thermoplastic resin composition can deteriorate, whereas, if the weight ratio of the talc to the wollastonite exceeds about 1:0.9, stiffness (warpage properties) of the thermoplastic resin composition can deteriorate.

In exemplary embodiments, the thermoplastic resin composition can include the inorganic fillers in an amount of about 10 parts by weight to about 40 parts by weight, for example, about 15 parts by weight to about 35 parts by weight, based on 100 parts by weight of the polycarbonate resin. In some embodiments, the thermoplastic resin composition can include the inorganic fillers in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments, the amount of the inorganic fillers can be in a range from about any of the foregoing amounts to about any other of the foregoing amounts.

Within this range, the thermoplastic resin composition can have excellent properties in terms of impact resistance, stiffness, dimensional stability, appearance, and balance therebetween.

(D) Maleic Anhydride-Modified Olefin Wax

The maleic anhydride-modified olefin wax can serve to improve bonding strength between the polycarbonate resin and the inorganic fillers and impact resistance of the thermoplastic resin composition and may include a polymer of olefin and maleic anhydride.

In exemplary embodiments, the olefin may be $C_{10}$ to $C_{500}$ α-olefin and may be present in an amount of about 80 wt % to about 99 wt %, for example, about 90 wt % to about 99 wt %, based on the total weight (100 wt %) of the olefin wax. In some embodiments, the olefin wax can include the olefin in an amount of about 80, 81, 82, 83, 84, 85, 86, 87, 88, 89, 90, 91, 92, 93, 94, 95, 96, 97, 98, or 99 wt %. Further, according to some embodiments, the amount of the olefin can be in a range from about any of the foregoing amounts to about any other of the foregoing amounts. Within this range, the thermoplastic resin composition can have excellent impact resistance.

In exemplary embodiments, the maleic anhydride may be present in an amount of about 1 wt % to about 20 wt %, for example, about 1 wt % to about 10 wt %, based on the total weight (100 wt %) of the olefin wax. In some embodiments, the olefin wax can include the maleic anhydride in an amount of about 1, 2, 3, 4, 5, 6, 7, 8, 9, 10, 11, 12, 13, 14, 15, 16, 17, 18, 19, or 20 wt %. Further, according to some embodiments, the amount of the maleic anhydride can be in a range from about any of the foregoing amounts to about any other of the foregoing amounts. Within this range, the thermoplastic resin composition can have excellent impact resistance.

In exemplary embodiments, the maleic anhydride-modified olefin wax may have a weight average molecular weight (Mw) of about 5,000 g/mol to about 100,000 g/mol, for example, about 10,000 g/mol to about 50,000 g/mol, as measured by gel permeation chromatography (GPC). Within this range, bonding strength between the polycarbonate resin and the inorganic fillers can be improved, and the thermoplastic resin composition can have excellent impact resistance.

In exemplary embodiments, the thermoplastic resin composition can include the maleic anhydride-modified olefin wax may be present in an amount of about 0.1 parts by weight to about 5 parts by weight, for example, about 0.3 parts by weight to about 1 part by weight, based on about 100 parts by weight of the polycarbonate resin. In some embodiments, the thermoplastic resin composition can include the maleic anhydride-modified olefin wax in an amount of about 0.1, 0.2, 0.3, 0.4, 0.5, 0.6, 0.7, 0.8, 0.9, 1, 2, 3, 4, or 5 parts by weight. Further, according to some embodiments, the amount of the maleic anhydride-modified olefin wax can be in a range from about any of the foregoing amounts to about any other of the foregoing amounts. Within this range, the thermoplastic resin composition can have excellent impact resistance.

(E) Phosphorus Compound

The phosphorus compound can serve to chelate metal ions from the talc and adjust pH of the thermoplastic resin composition to about 5.0 to about 8.0, which can reduce decomposition of the polycarbonate resin when the thermoplastic resin composition is processed. The phosphorus compound may be represented by the following Formula 1:

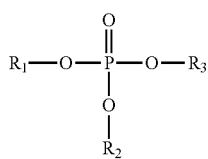

[Formula 1]

wherein $R_1$ and $R_2$ are the same or different and are each independently a hydrogen atom or a $C_1$ to $C_{10}$ alkyl group and $R_3$ is a $C_{10}$ to $C_{30}$ alkyl group.

Examples of the phosphorus compound may include without limitation octadecyl dihydrogen phosphate, stearyl dihydrogen phosphate, and the like, and mixtures thereof.

In exemplary embodiments, the weight ratio of the talc to the phosphorus compound (talc:phosphorus compound) may range from about 1:0.005 to about 1:0.05, for example, about 1:0.007 to about 1:0.03. In exemplary embodiments, a weight ratio of the talc to the phosphorus compound (talc:phosphorus compound) may be about 1:0.005, 1:0.006, 1:0.007, 1:0.008, 1:0.009, 1:0.01, 1:0.02, 1:0.03, 1:0.04, or 1:0.05. If the weight ratio of the talc to the phosphorus compound is less than about 1:0.005, impact resistance of the thermoplastic resin composition can deteriorate due to decomposition of the polycarbonate resin when the thermoplastic resin composition is processed, whereas, if the weight ratio of the talc to the phosphorus compound exceeds about 1:0.05, appearance characteristics of the thermoplastic resin composition can deteriorate.

In exemplary embodiments, the thermoplastic resin composition can include the phosphorus compound in an amount of about 0.1 parts by weight to about 5 parts by weight, for example, about 0.2 parts by weight to about 1.0 part by weight, based on about 100 parts by weight of the polycarbonate resin. In some embodiments, the thermoplastic resin composition can include the phosphorus compound in an amount of about 0.1, 0.2, 0.3, 0.4, 0.5, 0.6, 0.7, 0.8, 0.9, 1, 2, 3, 4, or 5 parts by weight. Further, according to some embodiments, the amount of the phosphorus compound can be in a range from about any of the foregoing amounts to about any other of the foregoing amounts. Within this range, the thermoplastic resin composition can have excellent properties in terms of impact resistance and appearance.

The thermoplastic resin composition may further include one or more typical additives, as needed. Examples of the additives may include without limitation flame retardants, antioxidants, drip inhibitors, lubricants, release agents, nucleating agents, antistatic agents, stabilizers, pigments, dyes, and the like, and mixtures thereof. When the additives are used, the additives may be present in an amount of about 0.001 parts by weight to about 20 parts by weight based on about 100 parts by weight of the base resin, without being limited thereto. In some embodiments, the thermoplastic resin composition can include the additive(s) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 parts by weight. Further, according to some embodiments, the amount of the additive(s) can be in a range from about any of the foregoing amounts to about any other of the foregoing amounts.

Examples of the flame retardants may include without limitation phosphorus flame retardants such as aromatic phosphoric ester compounds. Examples of the aromatic phosphoric ester compounds may include without limitation diphenyl phosphate, triphenyl phosphate, tricresyl phosphate, trixylenyl phosphate, tri(2,6-dimethylphenyl)phosphate, tri(2,4,6-trimethylphenyl)phosphate, tri(2,4-ditertiarybutylphenyl)phosphate, tri(2,6-dimethylphenyl) phosphate, bisphenol-A bis(diphenylphosphate), resorcinol bis(diphenylphosphate), resorcinol bis(2,4-ditertiarybutylphenylphosphate), and the like, and mixtures thereof.

The thermoplastic resin composition may have a notched Izod impact strength of about 4.5 kgf·cm/cm or more, for example, about 4.5 kgf·cm/cm to about 10 kgf·cm/cm, as measured on a ⅛" thick Izod specimen in accordance with ASTM D256 and a welded Izod impact strength of about 3.5 kgf·cm/cm or more, for example, about 3.5 kgf·cm/cm to about 6 kgf·cm/cm, as measured on a ⅛" thick Izod specimen having a weld line at the center thereof in accordance with ASTM D256.

In exemplary embodiments, the thermoplastic resin composition may have a coefficient of linear expansion of about 30 μm/° C. to about 60 μm/° C., for example, about 40 μm/° C. to about 50 μm/° C., as measured on a 6.4 mm bent specimen at a temperature of about 10° C. to about 90° C. in accordance with ASTM D696.

In exemplary embodiments, the thermoplastic resin composition may have a degree of warpage of about 5 mm to about 17 mm, for example, about 10 mm to about 15 mm, as obtained by measuring a distance (height) from the ground to one corner of an injection molded specimen having a size of 15 cm×40 cm×15 mm, with other three corners of the specimen attached to the ground, after leaving the specimen at 23° C. and 50% RH for 24 hours.

The thermoplastic resin composition according to the present invention may be prepared by a method of preparing a thermoplastic resin composition known in the art. For example, the above components and, optionally, one or more other additives, can be mixed, followed by melt extrusion in an extruder, thereby preparing a resin composition in pellet form.

A molded article can be produced from the thermoplastic resin composition as set forth above. For example, the prepared pellets as set forth above may be produced into various molded articles (products) through various molding methods, such as injection molding, extrusion, vacuum molding, and casting. Such molding methods are well known to those skilled in the art.

The molded article can exhibit excellent properties in terms of impact resistance, stiffness, dimensional stability, appearance, and balance therebetween, and thus the molded article can useful as an interior/exterior material for automobile parts or electrical/electronic products.

Next, the present invention will be described in more detail with reference to the following examples. It should be understood that these examples are provided for illustration only and are not to be construed in any way as limiting the present invention.

EXAMPLES

Details of components used in the following Examples and Comparative Examples are as follows:
(A) Polycarbonate Resin
A bisphenol-A polycarbonate resin (weight average molecular weight: 25,000 g/mol)

(B) Rubber-Modified Vinyl Graft Copolymer
A g-ABS resin prepared by grafting 52 wt % of styrene and acrylonitrile (weight ratio (SM/AN): 73/27) to 48 wt % of polybutadiene rubber (PBR, average particle diameter (Z-average): 310 nm).
(C) Inorganic Fillers
(C1) Talc (KCM-6300C, Haicheng Xinda Mining Industry Co., Ltd.)
(C2) Wollastonite (4W, NYCO Minerals)
(C3) Glass fiber (CS321 EC10-3, KCC Co., Ltd.)
(D) Maleic Anhydride-Modified Olefin Wax
A copolymer of α-olefin and maleic anhydride (DIAC-ARNA™, Mitsubishi Chemical Corporation)
(E) Phosphorus Compound
Octadecyl dihydrogen phosphate Examples 1 to 3 and Comparative Examples 1 to 3: Preparation of Thermoplastic Resin Composition The above components are placed in a 44 L/D twin-screw extruder having a diameter of 45 mm in amounts as listed in Table 1, followed by melt extrusion at an extrusion temperature of 250° C. and a stirring speed of 250 rpm, thereby preparing a thermoplastic resin composition in pellet form. The prepared pellets are dried at 90° C. for 3 hours or more, followed by injection molding using a screw-type injection machine (150 ton single injection machine) at 240° C. to 280° C., thereby preparing a specimen for property evaluation. The prepared specimen is evaluated as the following properties, and results are shown in Table 1.
Property Evaluation
(1) Notched Izod impact strength (unit: kgf·cm/cm): Notched Izod impact strength is measured on a ⅛" thick notched Izod specimen in accordance with ASTM D256.

(2) Welded Izod impact strength (unit: kgf·cm/cm): Welded Izod impact strength is measured on a ⅛" thick Izod specimen having a weld line at a center thereof in accordance with ASTM D256.
(3) Coefficient of linear expansion (CTE, unit: μm/° C.): Coefficient of linear expansion is measured on a 6.4 mm bent specimen at 10° C. to 90° C. in accordance with ASTM D696.
(4) Warpage (unit: mm): Warpage is evaluated by measuring a distance (height) from the ground to one corner of an injection molded specimen having a size of 15 cm×40 cm×15 mm, with other three corners of the specimen attached to the ground, after leaving the specimen at 23° C. and 50% RH for 24 hours.

TABLE 1

|  |  | Example | | | Comparative Example | | | | | |
| --- | --- | --- | --- | --- | --- | --- | --- | --- | --- | --- |
|  |  | 1 | 2 | 3 | 1 | 2 | 3 | 4 | 5 | 6 |
| (A) (parts by weight) | | 100 | 100 | 100 | 100 | 100 | 100 | 100 | 100 | 100 |
| (B) (parts by weight) | | 9.5 | 9.5 | 9.5 | 9.5 | 9.5 | 9.5 | 9.5 | 9.5 | 9.5 |
| (C) | (C1) | 21.6 | 24.9 | 19.1 | 21.6 | 30.9 | 16.2 | 21.6 | 21.6 | 21.6 |
| (parts by | (C2) | 10.8 | 7.5 | 13.3 | — | 1.5 | 16.2 | 10.8 | 10.8 | 10.8 |
| weight) | (C3) | — | — | — | 10.8 | — | — | — | — | — |
| (D) (parts by weight) | | 0.41 | 0.41 | 0.41 | 0.41 | 0.41 | 0.41 | 0.41 | 0.41 | — |
| (E) (parts by weight) | | 0.41 | 0.5 | 0.38 | 0.41 | 0.41 | 0.41 | 0.09 | 1.3 | 0.41 |
| Notched Izod impact strength | | 5.4 | 5.1 | 5.8 | 6.0 | 4.1 | 4.5 | 4.0 | 4.1 | 3.9 |
| Welded Izod impact strength | | 3.8 | 3.5 | 4.0 | 4.5 | 3.0 | 3.3 | 2.9 | 3.2 | 3.0 |
| Coefficient of linear expansion | | 43 | 46 | 41 | 35 | 57 | 40 | 44 | 42 | 40 |
| Warpage | | 14.7 | 12.1 | 15.0 | 25.1 | 10.7 | 17.1 | 14.8 | 15.0 | 13.9 |

From the above results, it can be seen that the thermoplastic resin compositions according to the present invention have excellent properties in terms of impact resistance (notched Izod impact strength, welded Izod impact strength), stiffness (warpage properties), and dimensional stability (coefficient of linear expansion).

Conversely, the thermoplastic resin composition of Comparative Example 1 which did not include wollastonite suffers from severe deformation in warpage evaluation and thus exhibits poor stiffness; the thermoplastic resin compositions of Comparative Examples 2 and 3 in which the weight ratio of talc to wollastonite did not fall within the range of the present invention exhibit poor properties in terms of impact resistance and stiffness; the thermoplastic resin compositions of Comparative Examples 2 and 3 in which the weight ratio of talc to a phosphorus compound did not fall within the range of the present invention exhibit poor impact resistance; and the thermoplastic resin composition of Comparative Example 6 which did not include wax exhibits poor impact resistance.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. The scope of the present invention should be defined by the appended claims and equivalents thereof.

What is claimed is:

1. A thermoplastic resin composition, comprising:
about 100 parts by weight of a polycarbonate resin;
about 8 parts by weight to about 20 parts by weight of a rubber-modified vinyl graft copolymer;
about 10 parts by weight to about 40 parts by weight of inorganic fillers comprising talc and wollastonite;
about 0.1 parts by weight to about 5 parts by weight of a maleic anhydride-modified olefin wax; and
about 0.1 parts by weight to about 5 parts by weight of a phosphorus compound represented by the following Formula 1:

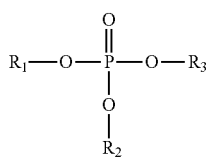

[Formula 1]

wherein $R_1$ and $R_2$ are the same or different and are each independently a hydrogen atom or a $C_1$ to $C_{10}$ alkyl group and $R_3$ is a $C_{10}$ to $C_{30}$ alkyl group,
wherein a weight ratio of the talc to the wollastonite ranges from about 1:0.1 to about 1:0.9, and a weight ratio of the talc to the phosphorus compound ranges from about 1:0.005 to about 1:0.05,
wherein a molded article produced from the thermoplastic resin composition has a welded Izod impact strength of 3.5 kgf·cm/cm to 6 kgf·cm/cm as measured on a ⅛" thick Izod specimen having a weld line at a center thereof in accordance with ASTM D256; a coefficient of linear expansion of 30 μm/° C. to 60 μm/° C., as measured on a 6.4 mm bent specimen at a temperature of about 10° C. to about 90° C. in accordance with ASTM D696; and a degree of warpage of 10 mm to 15 mm, as obtained by measuring a distance (height) from the ground to one corner of an injection molded specimen having a size of 15 cm×40 cm×15 mm, with other three corners of the specimen attached to the ground, after leaving the specimen at 23° C. and 50% RH for 24 hours.

2. The thermoplastic resin composition according to claim 1, wherein the rubber-modified vinyl graft copolymer is prepared by grafting an aromatic vinyl monomer and a monomer copolymerizable with the aromatic vinyl monomer to a rubbery polymer.

3. The thermoplastic resin composition according to claim 1, wherein the maleic anhydride-modified olefin wax is a polymer of about 80 wt % to about 99 wt % of olefin and about 1 wt % to about 20 wt % of maleic anhydride.

4. The thermoplastic resin composition according to claim 1, wherein the maleic anhydride-modified olefin wax has a weight average molecular weight of about 5,000 g/mol to about 100,000 g/mol.

5. The thermoplastic resin composition according to claim 1, further comprising at least one additive selected from the group consisting of flame retardants, UV stabilizers, fluorescent whitening agents, release agents, nucleating agents, lubricants, antistatic agents, stabilizers, reinforcing agents, pigments, dyes, and mixtures thereof.

6. The thermoplastic resin composition according to claim 1, wherein a molded article produced from the thermoplastic resin composition has a notched Izod impact strength of about 4.5 kgf·cm/cm or more, as measured on a ⅛" thick Izod specimen in accordance with ASTM D256.

7. A molded article produced from the thermoplastic resin composition according to claim 1.

8. A thermoplastic resin composition consisting essentially of:
about 100 parts by weight of a polycarbonate resin;
about 8 parts by weight to about 20 parts by weight of a rubber-modified vinyl graft copolymer;
about 10 parts by weight to about 40 parts by weight of inorganic fillers comprising talc and wollastonite;
about 0.1 parts by weight to about 5 parts by weight of a maleic anhydride-modified olefin wax; and
about 0.1 parts by weight to about 5 parts by weight of a phosphorus compound represented by the following Formula 1:

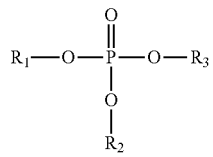

[Formula 1]

wherein $R_1$ and $R_2$ are the same or different and are each independently a hydrogen atom or a $C_1$ to $C_{10}$ alkyl group and $R_3$ is a $C_{10}$ to $C_{30}$ alkyl group, wherein a weight ratio of the talc to the wollastonite ranges from about 1:0.1 to about 1:0.9, and a weight ratio of the talc to the phosphorus compound ranges from about 1:0.005 to about 1:0.05, and
wherein a molded article produced from the thermoplastic resin composition has a notched Izod impact strength of about 4.5 kgf·cm/cm to about 10 kgf·cm/cm, as measured on a ⅛" thick Izod specimen in accordance with ASTM D256; a welded Izod impact strength of 3.5 kgf·cm/cm to 6 kgf·cm/cm, as measured on a ⅛" thick Izod specimen having a weld line at a center thereof in accordance with ASTM D256; a coefficient of linear expansion of 40 μm/° C. to 60 μm/° C., as measured on a 6.4 mm bent specimen at a temperature of about 10° C. to about 90° C. in accordance with ASTM D696; and a degree of warpage of 10 mm to 15 mm, as obtained by measuring a distance (height) from the ground to one corner of an injection molded specimen having a size of 15 cm×40 cm×15 mm, with other three corners of the specimen attached to the ground, after leaving the specimen at 23° C. and 50% RH for 24 hours.

9. The thermoplastic resin composition according to claim 1, wherein a molded article produced from the thermoplastic resin composition has a coefficient of linear expansion of 40 μm/° C. to 50 μm/° C., as measured on a 6.4 mm bent specimen at a temperature of about 10° C. to about 90° C. in accordance with ASTM D696.

* * * * *